US011447091B2

(12) United States Patent
Ruffner, II

(10) Patent No.: US 11,447,091 B2
(45) Date of Patent: Sep. 20, 2022

(54) VEHICLE AIR BAG STRUCTURAL DEVICE

(71) Applicant: Honda Motor Co., Ltd., Tokyo (JP)

(72) Inventor: Jimmie A. Ruffner, II, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/871,539

(22) Filed: May 11, 2020

(65) Prior Publication Data
US 2021/0347326 A1 Nov. 11, 2021

(51) Int. Cl.
| B60R 21/045 | (2006.01) |
| B60R 21/16 | (2006.01) |
| B60R 21/205 | (2011.01) |
| B60R 21/217 | (2011.01) |
| B60R 21/261 | (2011.01) |

(52) U.S. Cl.
CPC .......... B60R 21/261 (2013.01); B60R 21/205 (2013.01); B60R 21/2171 (2013.01); *B60R 2021/161* (2013.01); *B60R 2021/2172* (2013.01)

(58) Field of Classification Search
CPC ... B60R 21/261; B60R 21/205; B60R 21/217; B60R 21/2171; B60R 21/2172; B60R 21/16; B60R 2021/161; B60R 21/215; B60R 2021/21506; B60R 2021/21537
See application file for complete search history.

(56) References Cited

U.S. PATENT DOCUMENTS

| 5,482,313 | A | 1/1996 | Ikeya et al. |
| 6,161,865 | A | 12/2000 | Rose et al. |
| 6,682,093 | B2 * | 1/2004 | Tajima ................. B60R 21/201 |
| | | | 280/728.2 |
| 6,877,766 | B2 | 4/2005 | Mikolajewski |
| 6,994,372 | B2 * | 2/2006 | Ford .................. B60R 21/2035 |
| | | | 280/728.2 |
| 7,029,024 | B2 | 4/2006 | Baumbach |
| 7,093,847 | B2 | 8/2006 | Hurst |
| 7,255,365 | B2 | 8/2007 | Geyer et al. |
| 7,614,644 | B2 | 11/2009 | Hoffmann et al. |
| 8,033,567 | B2 | 10/2011 | Ooshino et al. |
| 8,459,687 | B2 | 6/2013 | Ooshino et al. |
| 9,415,740 | B2 * | 8/2016 | Motomochi .......... B60R 21/215 |
| 2010/0117337 | A1 * | 5/2010 | Yamauchi ............ B60R 21/217 |
| | | | 280/728.2 |
| 2019/0100164 | A1 * | 4/2019 | Citko .................... B60R 21/215 |

FOREIGN PATENT DOCUMENTS

DE 102010051794 A1 5/2012

* cited by examiner

*Primary Examiner* — James A English
*Assistant Examiner* — Daniel M. Keck
(74) *Attorney, Agent, or Firm* — Kenealy Vaidya LLP

(57) ABSTRACT

A vehicle air bag device can include an air bag retainer that has at least one clip located adjacent an opening at an outer periphery of the air bag retainer. An air bag chute can be located adjacent the air bag retainer and configured to guide the air bag along a deployment axis during deployment from the air bag retainer. The air bag chute can include a wall including a clip aperture opening located therein. The at least one clip can have an upper surface facing an upper surface of the clip aperture opening, and the upper surface of the at least one clip can be at an acute angle with respect to the deployment axis. The acute angle upper surface can extend from an interior of the air bag chute through the clip aperture and to an exterior of the air bag chute.

18 Claims, 14 Drawing Sheets

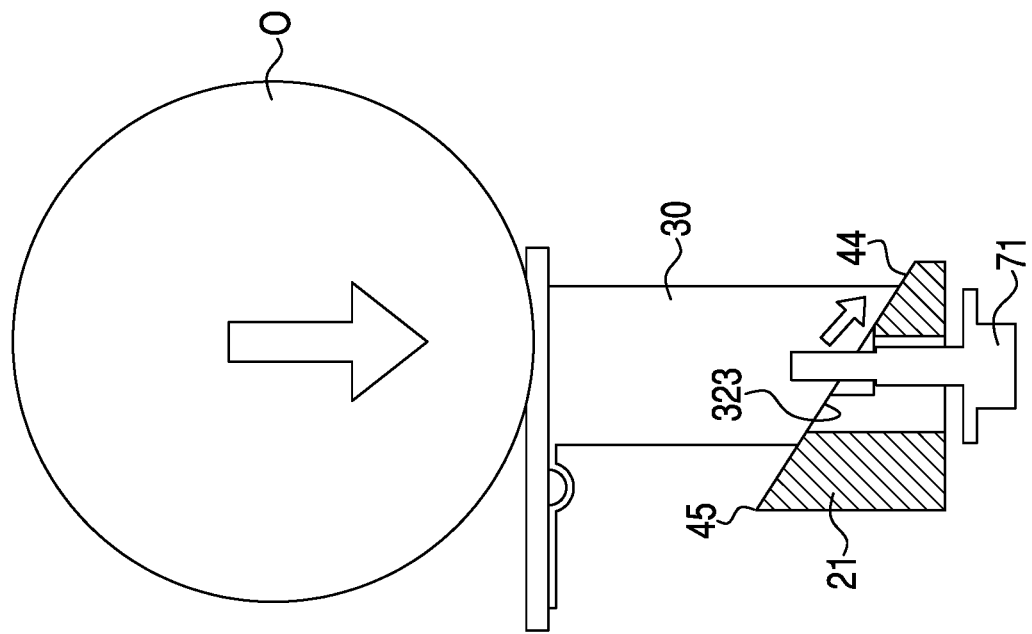
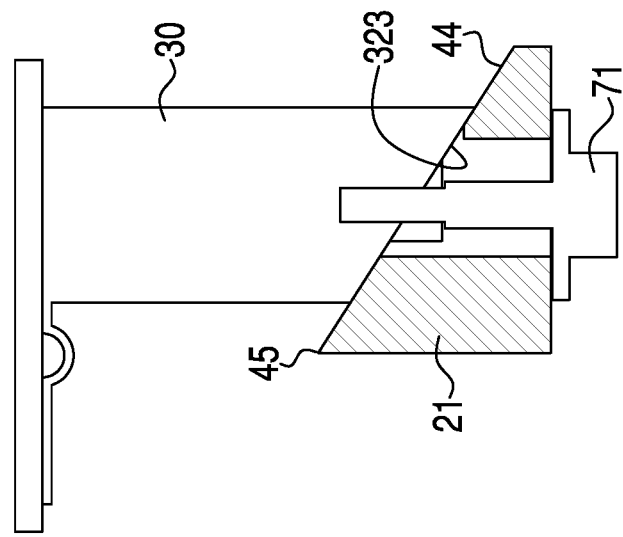
FIG. 7B
FIG. 7A

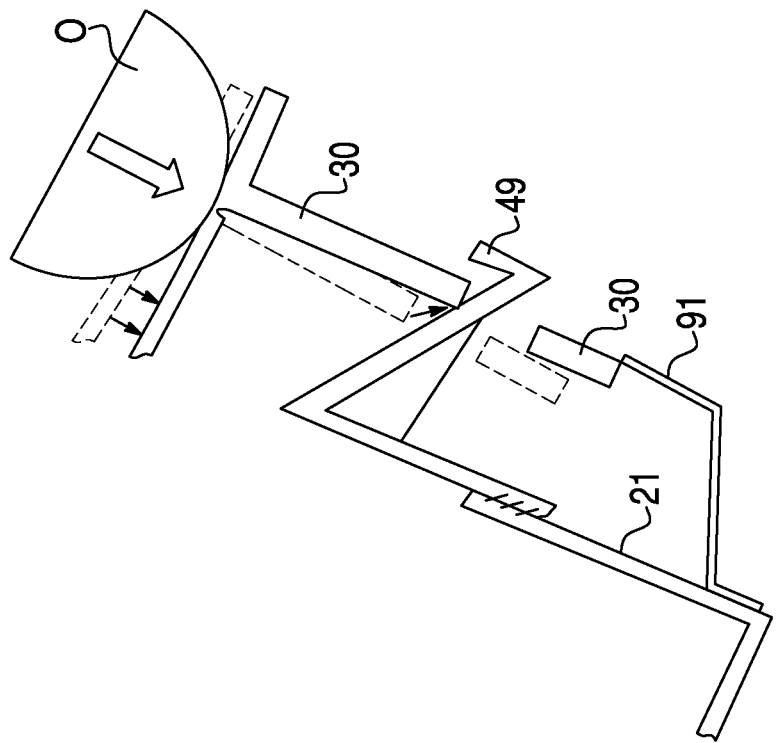
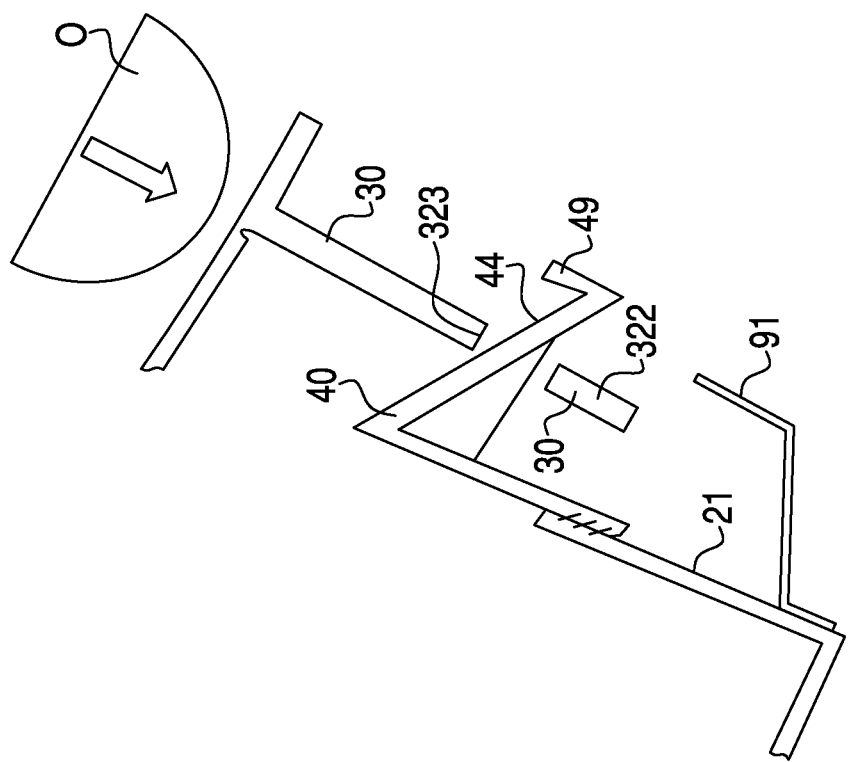
FIG. 9A
FIG. 9B

VEHICLE AIR BAG STRUCTURAL DEVICE

BACKGROUND

The disclosed subject matter relates to a vehicle air bag structural device that includes an airbag, an actuator, an airbag retainer, and an airbag chute. More particularly, the disclosed subject matter relates to a connection structure for connecting the airbag retainer to the airbag chute in a vehicle instrument panel or dashboard.

SUMMARY

According to an aspect of the disclosed subject matter, a vehicle air bag structural device can include an air bag retainer configured to hold a vehicle air bag before deployment. The air bag retainer can define an opening through which the air bag passes during deployment. At least one clip can be located adjacent the opening at an outer periphery of the air bag retainer. An air bag chute can be located adjacent the air bag retainer and configured to guide the air bag along a deployment axis and at least partially out of an upper opening in the air bag chute during deployment from the air bag retainer. The air bag chute can have a wall including a clip aperture opening located therein. The clip aperture opening can have an upper surface and a lower surface, the upper surface located closer to the upper opening in the air bag chute than the lower surface of the clip aperture opening. The at least one clip can have an upper surface facing the upper surface of the clip aperture opening, the upper surface of the at least one clip being at an acute angle with respect to the deployment axis and the acute angle upper surface extending from an interior of the air bag chute through the clip aperture and to an exterior of the air bag chute. Thus, if the air bag chute is moved downward towards the air bag retainer along the deployment axis a pre-set distance, the upper surface of the clip aperture contacts the upper surface of the at least one clip to cause the wall of the air bag chute to continue moving outward and downward along the acute angle upper surface of the at least one clip.

According to another aspect of the disclosed subject matter, a structure for retaining and deploying a vehicle air bag can include an air bag chute configured as a tubular structure having an upper exit aperture configured for the air bag to exit along a deployment axis during deployment, and a lower aperture, the chute including a side wall extending from the upper exit aperture to the lower aperture, the side wall of the chute including at least one opening extending therethrough with the side wall defining a peripheral surface of the opening; an air bag retainer located adjacent the lower aperture of the air bag chute and configured to store the air bag when in an undeployed state; a hook attached to the air bag retainer and including an upward extending portion, and an outward and downward sloped portion extending from an apex of the upward extending portion, wherein the apex of the upward extending portion is located within the air bag chute such that the outward and downward sloped portion extends from a location within the side wall of the air bag chute, through the opening in the side wall, and to a location outside the side wall of the air bag chute.

According to another aspect of the disclosed subject matter, a structure for retaining and deploying a vehicle air bag can include an air bag retainer configured as a tubular structure with an upper opening at an upper portion of the tubular structure and a closed bottom at a lower portion of the tubular structure. An air bag chute can also be provided and configured as a tubular structure having an upper exit opening configured for the air bag to exit along a deployment axis during deployment, and a lower opening aligned with the upper opening of the air bag retainer tubular structure. The air bag chute can include a side wall extending from the upper exit opening to the lower opening, the side wall of the air bag chute including at least one opening extending therethrough. The tubular structure of the air bag retainer can be telescopically located within the tubular structure of the air bag chute such that the air bag chute is movable with respect to the air bag retainer along a telescoping axis direction if a predetermined force is applied to the air bag chute in the telescoping axis direction. A hook can extend from the tubular structure of the air bag retainer through the at least one opening in the side wall of the tubular structure of the air bag chute. The hook can include an upper surface that is at an acute angle greater than zero with respect to the telescoping axis direction, and the upper surface of the hook faces upwards towards the upper exit opening of the air bag chute.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 7A is a schematic view of another embodiment of connection structure for connecting the air bag retainer to the air bag chute made in accordance with principles of the presently disclosed subject matter;

FIG. 7B is a schematic view of the connection structure of FIG. 7A after contact with an object;

FIG. 9A is a schematic view of another embodiment of connection structure for connecting the air bag retainer to the air bag chute made in accordance with principles of the presently disclosed subject matter;

FIG. 9B is a schematic view of the connection structure of FIG. 9A after initial contact with an object;

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
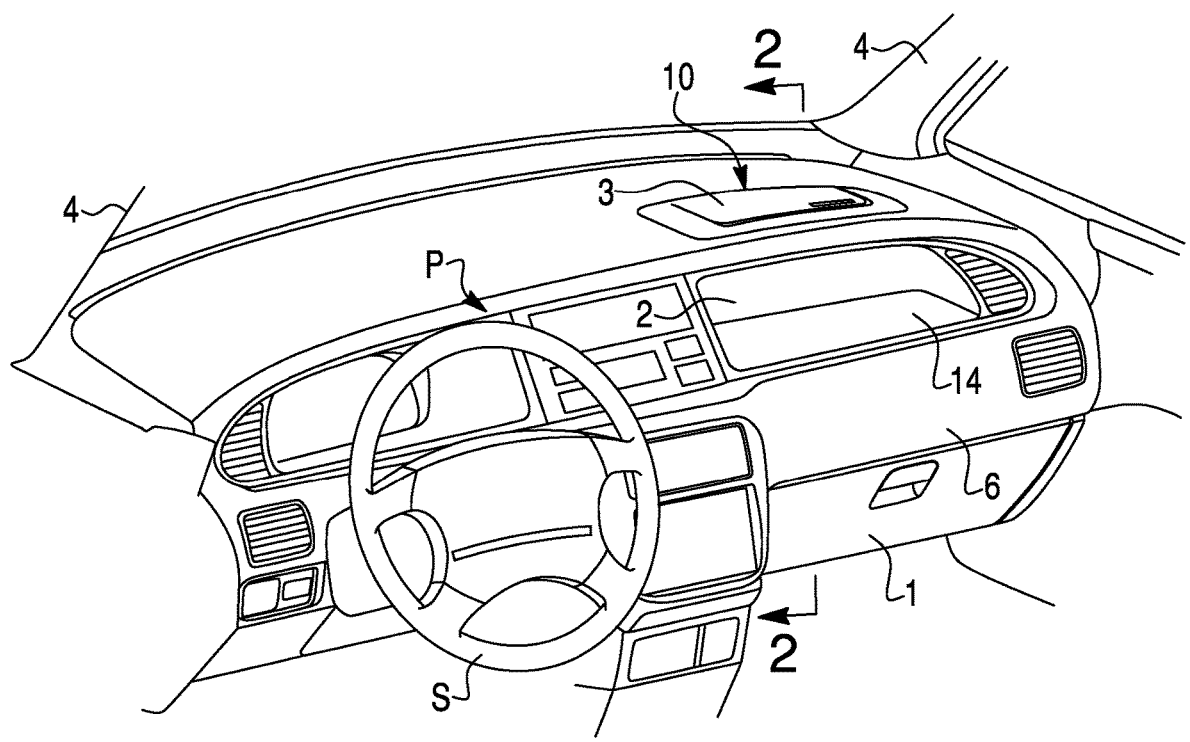
FIG. 1 is a perspective view of an interior of a vehicle made in accordance with principles of the disclosed subject matter.

FIG. 1 illustrates an interior of a vehicle in which an instrument panel P can be mounted at a front end of the inside the vehicle. The instrument panel P can extend transversely across the vehicle and extend between a vehicle's A-pillars 4. A glove box 1 can be provided in a lower portion passenger side of the instrument panel P. A tray 14 can be mounted above the glove box 1 and in an upper portion of a passenger side 2 of the instrument panel P. A pad portion 6 of the instrument panel P can be located above the glove box 1 and supported via a mounting bracket 9 (see FIG. 2). The mounting bracket 9 can be mounted on a frame extending in a lateral (or other) direction of the vehicle.

In the embodiment shown in FIG. 1, a passenger protection system 10 in the form of an airbag system can be located in the instrument panel P/dashboard of the vehicle. A lid 3 can be provided on a top surface of the instrument panel P/dashboard through which an air bag can be deployed to protect the passenger side occupant of the vehicle. The lid 3 can be in the form of a fabric or plastic enclosure panel that is frangible upon deployment of the air bag stored thereunder. Thus, the passenger air bag system in this embodiment is located immediately below the lid 3 in the upper surface of the instrument panel P/dashboard, and behind the tray 14.

Figure 2:
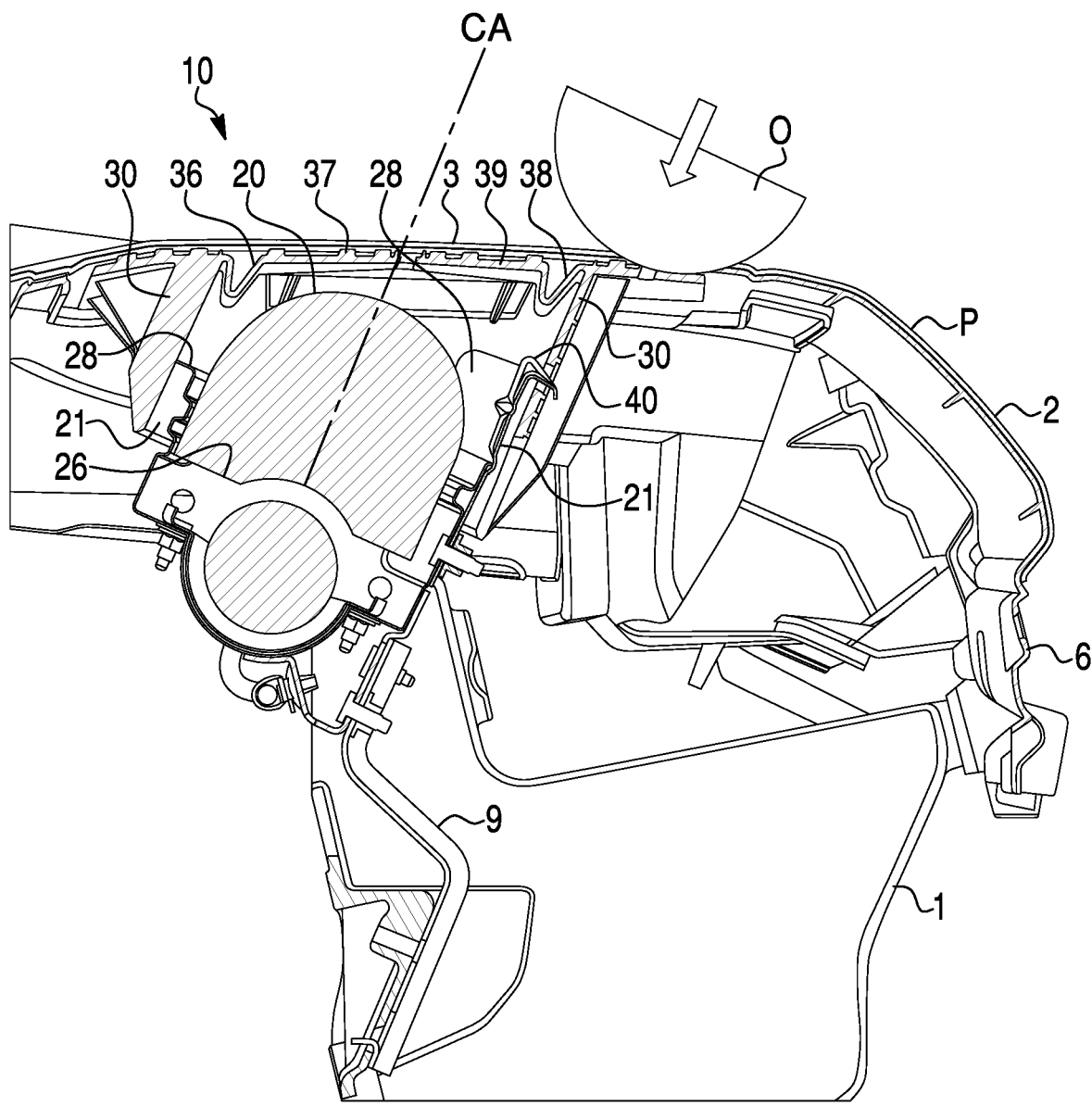
FIG. 2 is a cross sectional view of a passenger airbag system and instrument panel structure of FIG. 1.

FIG. 2 illustrates a cross-sectional view taken along line 2-2 of the instrument panel P of FIG. 1. The cross-sectional view shows a passenger protection system 10 located under or within the instrument panel P/dashboard 2. The passenger protection system 10 can include an airbag retainer 21 housing an airbag 20, along with an airbag chute 30 configured to direct the airbag 20 out of the airbag retainer 21 along a central axis CA (also referred to as a deployment axis) of both the airbag retainer 21 and airbag chute 30 during deployment. Under certain impact or collision conditions, the air bag 20 can be inflated and caused to discharge from the airbag retainer 21 and directed outward toward the passenger compartment of the vehicle via the airbag chute 30. The airbag 20, when being inflated and discharged, will force a first door 37 and second door 39 to open by rotation about respective hinges 36, 39. The opening doors 37, 39 will cause the lid 3 to also open, for example, by tearing along a weakened outline portion. Thus, the airbag 20 can fully deploy via the airbag cute 30 and opening in the lid 3 into the vehicle passenger compartment to protect a vehicle passenger from contact with the instrument panel P and other more rigid surfaces in the vehicle.

An airbag retainer 21 can have a first closed end at lower surface 26 and a second end at an upper opening 28. The airbag 20 can be located in the airbag retainer 21 and attached to the lower surface 26, and can consist or comprise of an airbag cushion, a flexible fabric bag, an airbag deployment module, and an airbag electronic controller unit. During an impact, a vehicle can provide collision information to the electronic controller unit of the airbag 20. If the collision information meets the criteria for deployment, one or more airbag deployment modules within the vehicle can cause the airbag to deploy by, for example, quickly filing with air or other fluid. The airbag 20 can deploy along a deployment or central axis CA of both the airbag retainer 21 and airbag chute 30. The airbag 20 can inflate and deflate during collision.

In contrast, if certain collision information does not warrant deployment of the airbag 20 (i.e., non-deployment circumstance), and yet an object such as a passenger body part, comes into contact with the instrument panel P, there are several features that can be utilized to minimize the transmission of force from the vehicle to the object during such a non-deployment circumstance. For example, padding can be used on various surfaces of the vehicle to minimize transmittal of force to the object O. In addition, when an object O comes into contact with the instrument panel P, the force of the object O travels across the instrument panel P. The force also travels to the airbag chute 30 and the airbag retainer 21 that are in contact with each other underneath the lid 3. The airbag retainer 21 is typically rigidly connected to the vehicle frame so that the force necessary for the airbag deployment module to deploy the air bag 20 acts in a single direction (away from the lower surface 26 of the airbag retainer towards the airbag chute 30 and towards the passenger compartment of the vehicle). Thus, if the air bag chute 30 is permitted to move downward with respect to the airbag retainer 21, during a non-deployment contact situation, the stroke by which the object O can travel during contact with the instrument panel P can be increased, which can reduce the amount of force transferred from the instrument panel P to the object O.

Figure 3A:
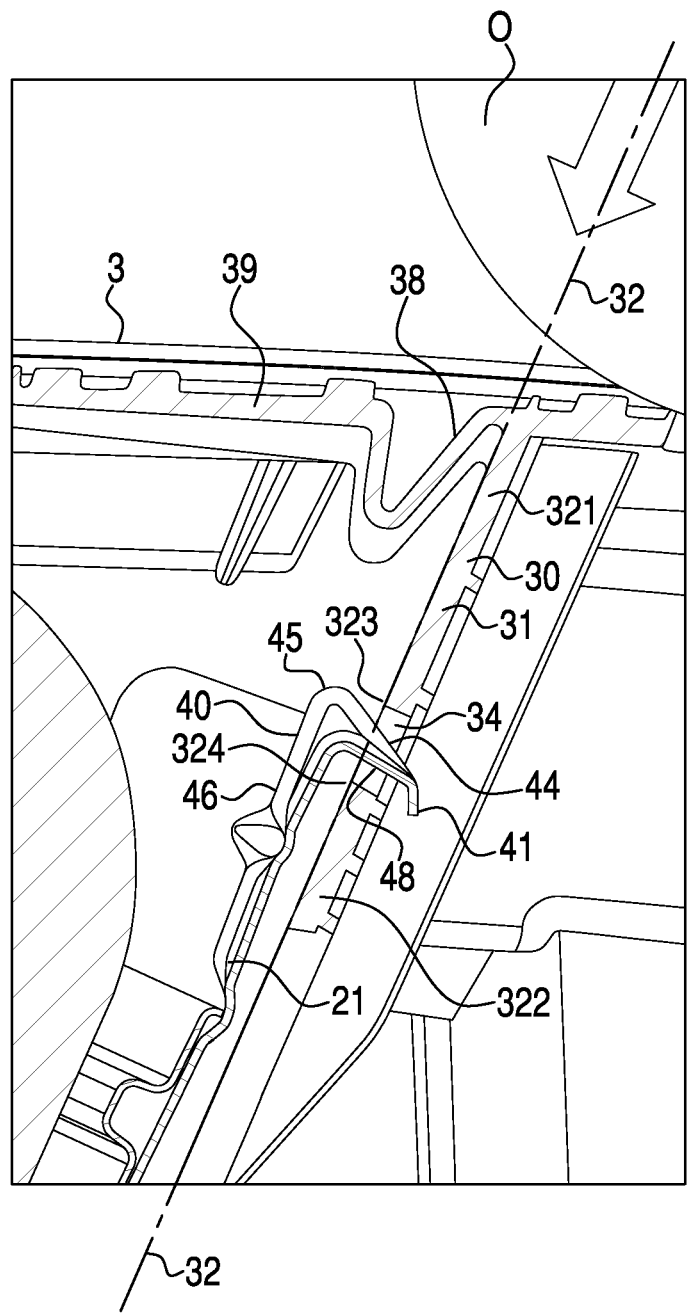
FIG. 3A is a cross sectional view of an airbag chute retainer clip, airbag chute, and airbag retainer of the passenger airbag system of FIG. 2 in a first non-compressed state.

In FIG. 3A, the airbag chute 30 is shown having a retainer engagement wall 31. The retainer engagement wall 31 can have an upper chute wall 321 and a lower chute wall 322. The upper chute wall 321 can have an upper chute wall contact edge 323 and the lower chute wall 322 can have a lower chute wall contact edge 324. A chute wall opening 34 located in the retainer engagement wall 31 can be defined by the upper chute contact edge 323 and the lower chute contact edge 324. In addition, the upper chute contact edge 323 and the lower chute contact edge 324 can both be located within a substantially flat plane 32 that can also contain a substantial (more than half) of the upper chute wall 321 and lower chute wall 322.

In an exemplary embodiment, the retainer engagement wall 31 can be integrally connected with a first end of the second hinge 38. The second deployment door 39 can extend from a second end of the hinge 38. Thus, in this embodiment, the hinge 38 can be referred to as a "living hinge" that is made from a single integral and continuous material extending from the wall 31 to an end of the door 39. The opposite side of wall 31 can be similarly formed with the first hinge 36 and first door 37. The lid 3 of the instrument panel P can be located on top of the doors 37, 39. When the airbag 20 is deployed, the doors 37, 39 can rotate about the hinges 36, 38, respectively, allowing the airbag 20 to inflate out of the instrument panel P and into the interior of the vehicle.

The chute wall opening 34 can be configured to allow an airbag chute retainer clip 40 attached to the airbag retainer 21 to attach to the airbag chute 30. As indicated above, the manner in which the airbag retainer 21 is attached to the airbag chute 30 can determine the rigidity and the energy absorption characteristics for the instrument panel P. For example, if an object O imposes a load onto the instrument panel P, that load can travel from the airbag chute 30 to the airbag retainer 21. Thus, as will be described in more detail below, the attachment structure between the airbag chute 30 and airbag retainer 21 can be configured to allow the airbag chute 30 to move downward along the central axis direction with respect to the airbag retainer 21 when an object contacts the instrument panel P at a location above the airbag chute 30 and/or at the lid 3.

Referring to FIG. 3A, the airbag chute retainer clip 40 can be attached or integrally extend from the airbag retainer 21. For example, a clip attachment extension 46 can be provided that extends downward from an apex 45 of the clip 40 for attachment to the airbag retainer 21 via various attachment structures and methods, including attachment via integral molding with the airbag retainer 21, via attachment structures such as screws, bolts, rivets, via adhesive, via welding, or via other known attachment structure or method. The clip 40 can extend at an acute angle from the clip apex 45 to an outer tip edge 41 of the clip to form an upper surface 44 of the clip 40. Thus, the upper surface 44 of the clip 40 will form an acute angle (in this embodiment between 25 and 65 degrees) with respect to the central axis CA of both the airbag retainer 21 and airbag chute 30. In addition, the upper surface 44 of the clip 40 will form the acute angle with respect to the plane 32 that contains the upper and lower chute wall contact edges 323, 324. The airbag chute retainer clip 40 can be made from metal, plastics, ceramics, and/or combinations of these materials. The clip 40 can be formed integrally with the airbag retainer 21 or can be attached thereto via welding, adhesive, or attachment structures such as screws, rivets, bolts and the like, or combinations thereof. In FIG. 3A, the clip upper surface 44 is formed from a different structure as compared to the lower surface 48, although they could be formed from the same material and structure. The lower surface 48 can extend substantially perpendicular with respect to the central axis CA and the plane 32.

When assembled, the clip 40 can be placed through the chute wall opening 34 of the airbag chute 30. The apex 45 can be located within the air bag chute 30 while the upper surface 44 passes through the opening 34 and the outer tip edge 41 can be located outside of the airbag chute 30. Thus, the plane 32 that contains the edges of the opening 34 intersects the angled upper surface 44 of the clip 40. The plane 32 that contains the edges of the opening 34 also intersects at a right angle with the lower surface 48 of the clip 40.

Figure 3B:
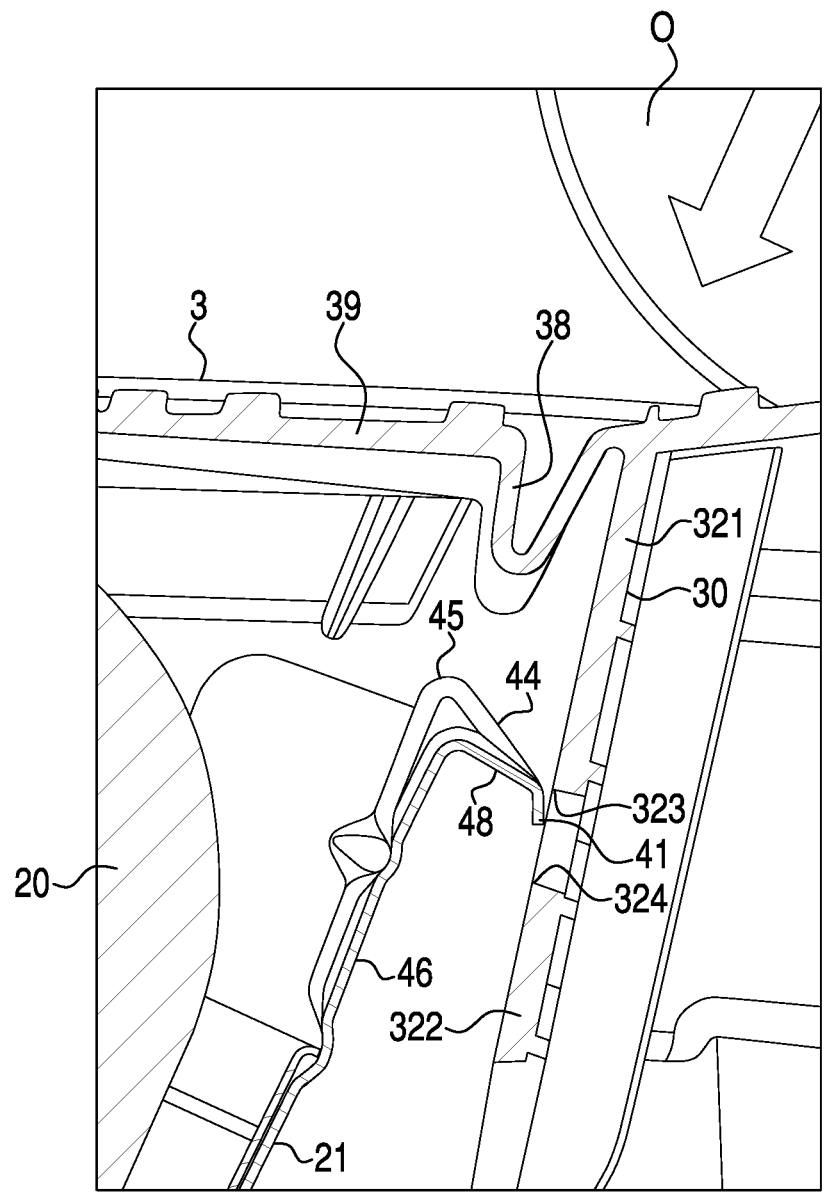
FIG. 3B is a cross sectional view of the airbag chute retainer clip, airbag chute, and airbag retainer of the passenger airbag system of FIG. 2 in a second compressed state.

As shown in FIG. 3B, when an object O comes into contact with the instrument panel P, the force of the object O travels down the airbag chute 30. The force can cause the contact edge 323 of the upper chute wall 321 to engage with the upper angled surface 44 of the airbag chute retainer clip 40. The incline of the acute angled upper surface 44 can cause the upper chute wall 321 to slide away or bend away from the central axis of the airbag chute 30. This movement can provide more stroke or travel of the airbag chute 30 downward towards the airbag retainer 21 during an impact event, resulting in greater energy absorption and lesser impact force on the object O.

In FIG. 3A, the apex 45 of the airbag chute retainer clip 40 is shown located closer to upper opening in the chute 30 (or, closer to the doors 37, 39 of the airbag chute 30 that define the opening in the chute 30) along a central axis direction as compared to the location of the opening 34 in the airbag chute in the central axis direction. More specifically, apex 45 of the airbag chute retainer clip 40 can be located closer to the upper opening in the chute 30 (or, closer to the doors 37, 39 of the airbag chute 30) in a direction along the central axis CA than is the upper chute wall contact edge 323 to the upper opening in the chute 30 along the central axis CA direction. Similarly, the outer tip edge 41 of the clip 40 can be located further from the upper opening in the chute 30 in the central axis CA direction as compared to the opening 34 and/or compared to the lower chute wall edge 324 in the central axis CA direction.

The clip 40 can also include a lower surface 48 configured such that during deployment of the airbag 20, the clip lower surface 48 contacts the airbag chute 30 to retain the airbag chute 30 within the instrument panel P and anchored to the airbag retainer 21. Specifically, when the airbag 20 is deployed, the airbag 20 contacts the first and second deployment doors 37, 39 with enough force to open the doors 37, 39 and tear open the lid 3. Thus, the airbag chute 30, which is connected to the doors 37, 39, will experience an upward force during this deployment and may begin upward movement. In order to prevent this upward movement of the airbag chute 30, the clip lower surface 48 will contact the lower chute wall edge 324 of the opening 34 in the airbag chute 30 to retain the airbag chute 30 within the instrument panel P and attached or anchored to the airbag retainer 21.

Figure 4B:
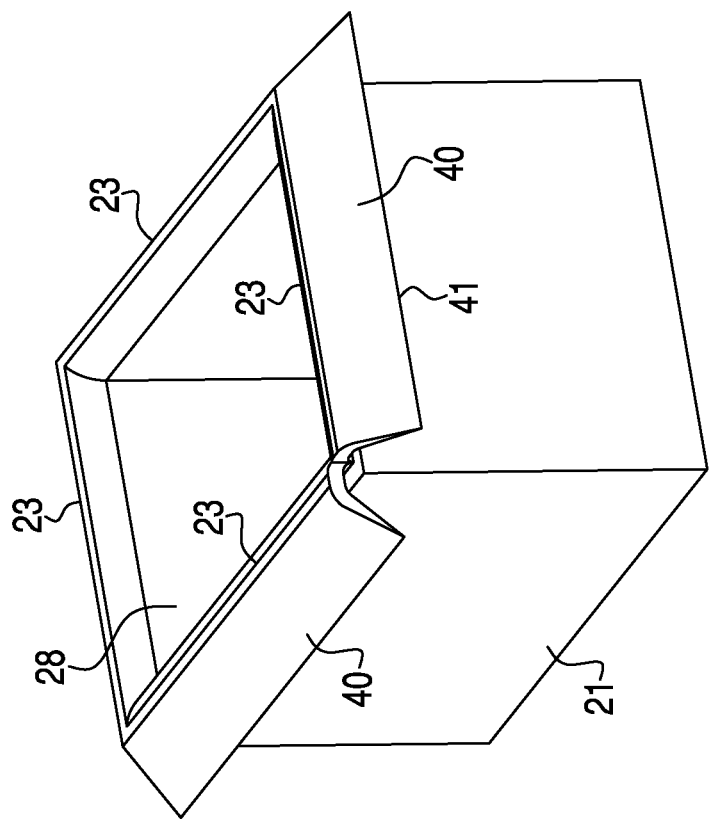
FIG. 4B is a perspective view another embodiment of an airbag retainer for a passenger airbag system.
Figure 4A:
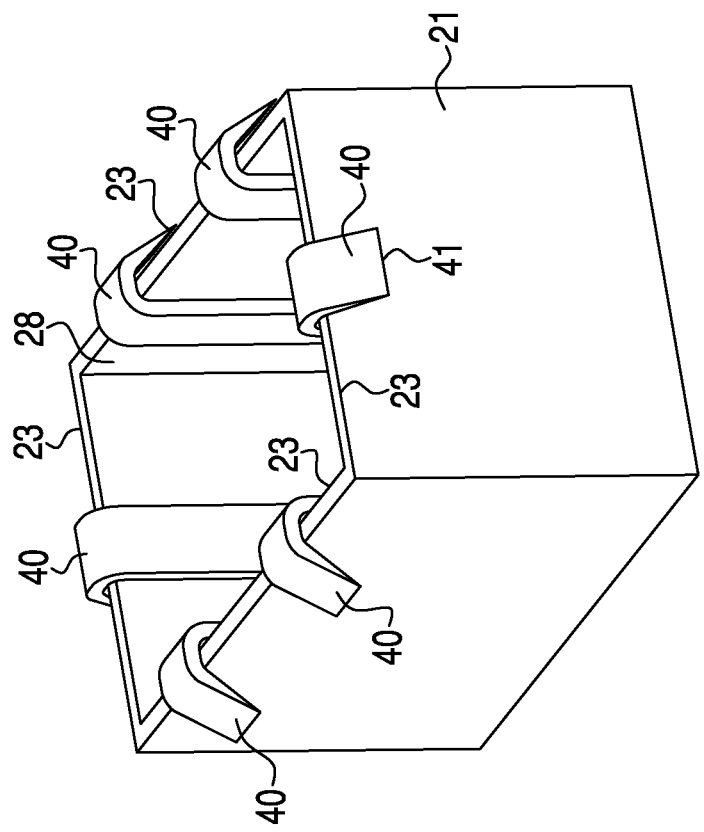
FIG. 4A is a perspective view another embodiment of an airbag retainer for a passenger airbag system.

FIGS. 4A and 4B depict alternative embodiments for the airbag retainer 21 and clips 40. In FIG. 4A, a plurality of clips 40 can be located along each linear top edge 23 of the airbag retainer 21. By contrast, FIG. 4B shows a single clip 40 formed along a substantial entirety of each linear top edge 23 of the airbag retainer 21. Each of the clips 40 can include an outer tip edge 41 and can be configured to extend through a mating opening 34 in a corresponding airbag chute 30 that has a chute wall opening 34 configured for connection to the alternately styled clip(s) 40 as described above. Thus, the airbag retainer 21 can include clips 40 located on a single side of the airbag retainer 21 as shown in FIG. 2, or can include clips 40 on multiple edges 23 as shown in FIGS. 4A and 4B. In the embodiment of FIG. 2, the airbag retainer 21 can be directly welded, adhered, or connected to the airbag chute 30 at a location opposed to the clip 40 (left side of the chute 30 in FIG. 2) such that no movement can occur between the airbag chute 30 and airbag retainer 21 at that location. Unlike the location where the connection of the air bag retainer 21 and air bag chute 30 is accomplished via clip 40 (right side of FIG. 2), this left side location is spaced away from the occupant of the vehicle and is unlikely to encounter force from contact with an occupant of the vehicle. Thus, the airbag chute 30 can be moveably attached to the airbag retainer 21 at a first location and immovably attached to the airbag retainer 21 at a second location opposed to the first location. Of course, if a clip 40 is desired on the left side location in FIG. 2, that is also a possible configuration for another embodiment of the disclosed subject matter.

Figure 5A:
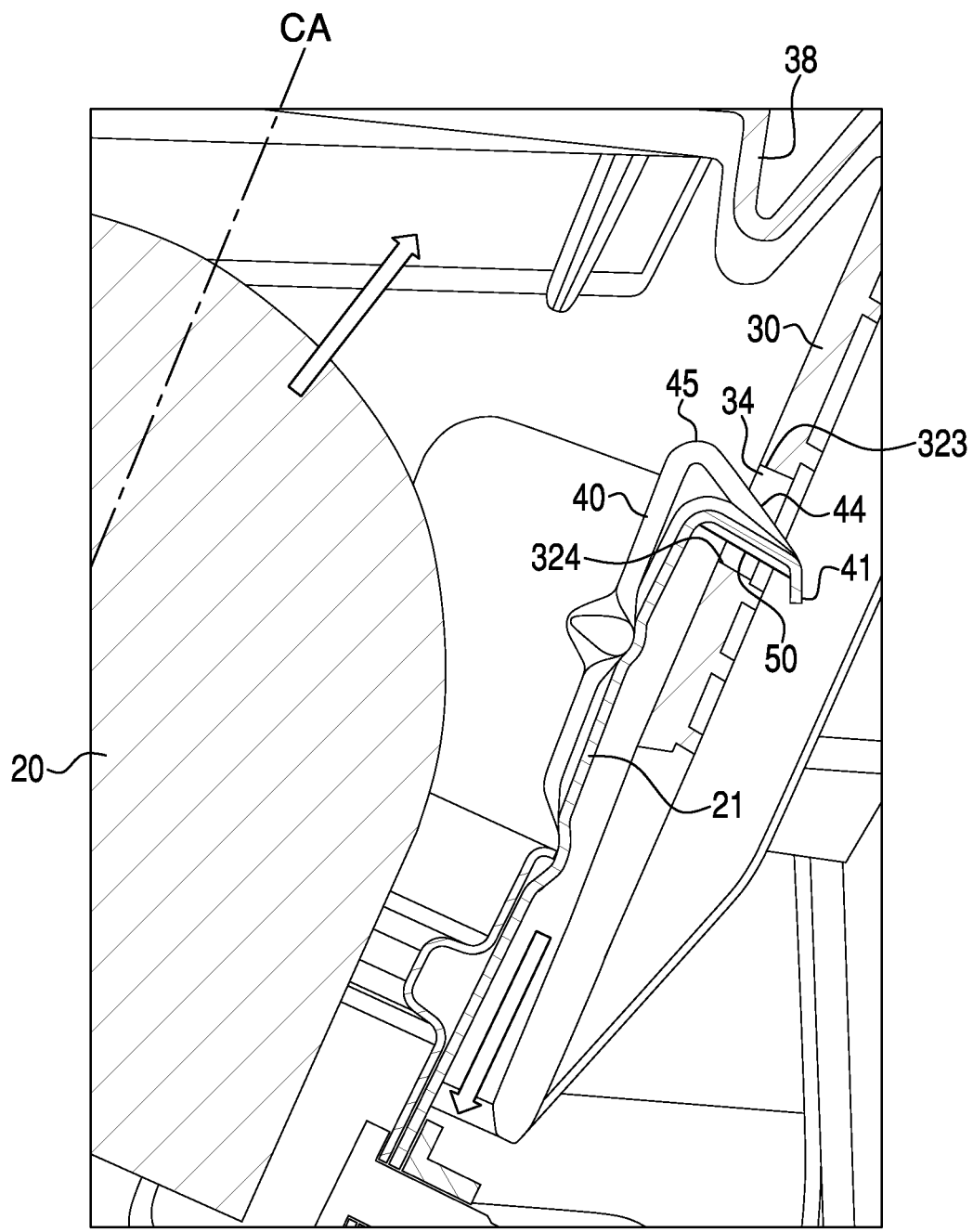
FIG. 5A is a partial perspective view of an alternate embodiment of the airbag chute retainer clip for use with the passenger air bag system of FIG. 1.
Figure 5B:
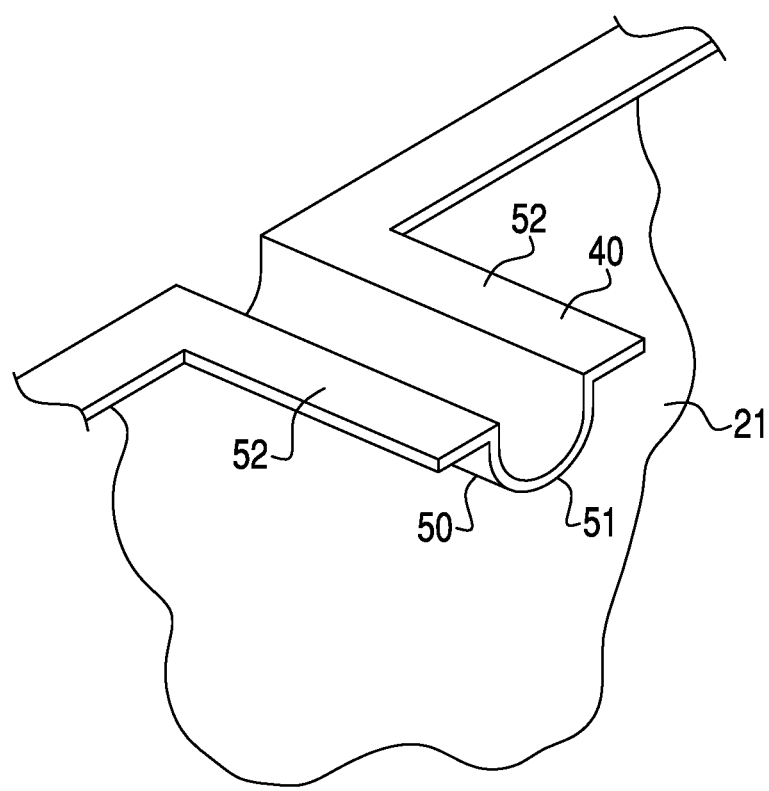
FIG. 5B is a perspective top view of the airbag chute retainer clip and air bag retainer of FIG. 5A.

FIGS. 5A and 5B depict another embodiment of the clip 40 of the presently disclosed subject matter. In this embodiment, the clip 40 can include a bead 50 that extends in a direction away from the central axis CA of the airbag retainer 21. The bead 50 can include a lower curved surface 51 that forms a type of half pipe along the length of the bead 50 bordered by a top edge wall 52 on either side of the curved surface 51. The construction provides additional torsional strength to the clip 40 to prevent the clip 40 from bending along an axis that extends along a longitudinal axis of the half pipe formed by the lower curved surface 51 and that extends perpendicularly away from the central axis CA. Thus, the clip 40 can provide a stronger anchor connection for the airbag chute 30 when the airbag 20 is deployed and the lower edge 324 of the opening 34 in the airbag chute 30 contacts the clip 40.

Although certain exemplary embodiments of the disclosed subject matter are described above and shown in the figures, it should be understood that the disclosed subject matter can be achieved using various alternative embodiments.

For example, although it is shown that the airbag retainer 21 of FIG. 2 can house the airbag 20 within a plurality of rectangular or square shaped walls 22 that include an airbag chute retainer clip 40 mounted to a top edge 23 of one of the plurality of walls 22, it is contemplated that the retainer clips 40 can be mounted below the upper edge 23 of at least one of the plurality of walls 22. In addition, the walls 22 can be shaped differently, in order to fit within a particular space. For example, the walls 22 can be comprised of a single side wall that is tubular in shape with a circular, oval, or other cross section when viewed along the central axis of the airbag retainer 21. Likewise, the airbag chute 30 can be tubular and shaped similar in cross section (e.g., circular, square, rectangle, oval, etc.) to the airbag retainer 21 such that the airbag chute 30 can slide within or over the airbag retainer 21. In addition, the specific width and shape of the clips 40 can vary greatly and remain within the spirit and scope of the presently disclosed subject matter. If the clip 40 is narrow, more clips can be provided to ensure proper attachment and force of retention.

Figure 6A:
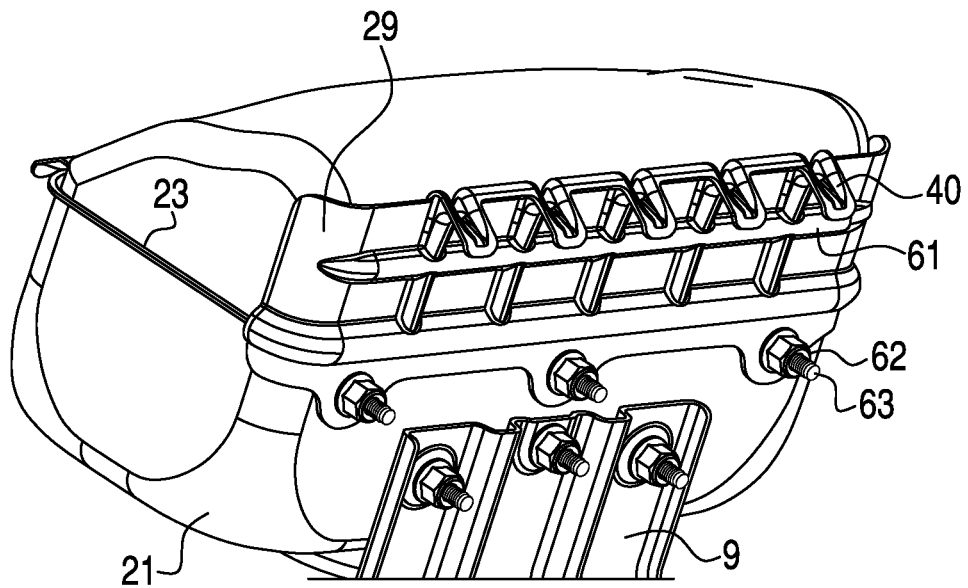
FIG. 6A is a perspective view of another embodiment of an airbag retainer made in accordance with principles of the presently disclosed subject matter.
Figure 6B:
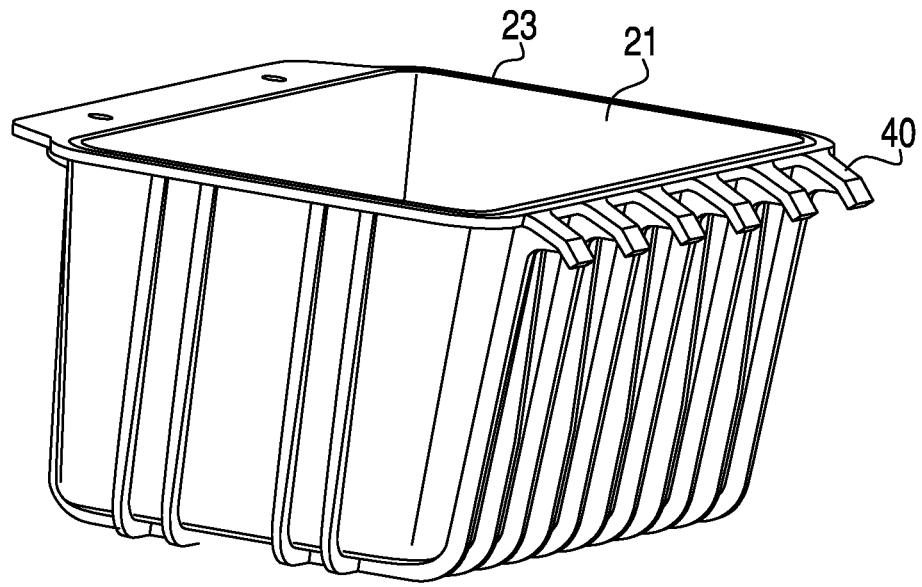
FIG. 6B is a perspective view of another embodiment of an airbag retainer made in accordance with principles of the presently disclosed subject matter.
Figure 6C:
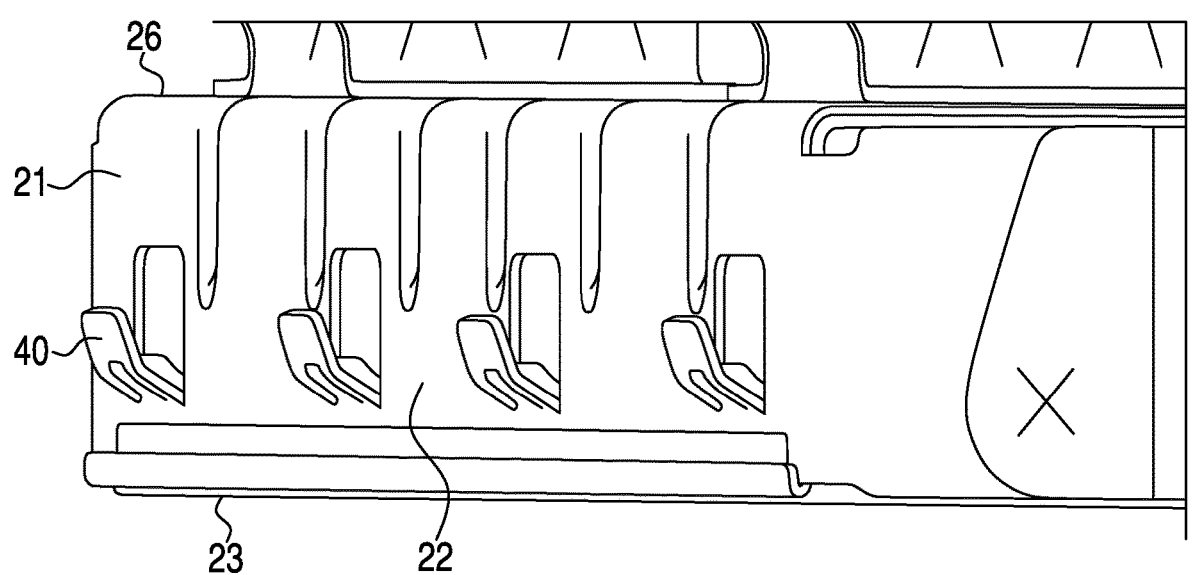
FIG. 6C is a perspective view of another embodiment of an airbag retainer made in accordance with principles of the presently disclosed subject matter.

FIGS. 6A-6C depict three additional embodiments of an airbag retainer 21 made in accordance with principles of the presently disclosed subject matter. In the embodiment of FIG. 6A, a plurality of clips 40 can be formed on a wall extension bracket 29. The wall extension bracket 29 can be attached to a top edge 23 of the airbag retainer 21 by various attachment structures or methods, including use of a threaded attachment structure 63 that extends from the airbag retainer 21 and to which a nut 62 attaches to secure the wall extension bracket 29 to the airbag retainer 21. Of course, the wall extension bracket 29 can be mounted to the airbag retainer 21 by various other means, including welding, rivets, adhesives, clamps, or other known structures and methods for attachment. The wall extension bracket 29 can consist of a single plate like structure or can be divided into a plurality of structures attached to the airbag retainer 21. The wall extension bracket 29 can be a stamped structure that includes ribs 61 to provide strength and rigidity to the wall extension bracket 29. In this embodiment the airbag retainer clips 40 are formed in a similar manner as the clips 40 shown in FIGS. 5A and 5B. However, the retainer clips 40 shown in FIG. 6A can be formed in various other manners and can be configured in the form similar to other embodiments disclosed or contemplated herein.

In the embodiment of FIG. 6B, the retainer clips 40 can be integrally formed with the retainer wall 22. The clips 40 can be integrally formed along the top edge 23 of the retainer wall 22. Thus, the air bag retainer 21 and clips 40 can be made from a single continuous integral material, such that no attachment structure or stamping procedures are necessary to form the clips 40 in the air bag retainer 21.

In the embodiment of FIG. 6C, the retainer clips 40 can be located at a middle portion of the retainer wall 22. Specifically, the retainer clips 40 can be spaced from the top edge 23 of the air bag retainer 21 such that the plurality of clips 40 are located between the top edge 23 and the lower surface 26 of the retainer 21. The plurality of clips 40 can stamped such that they protrude from a plurality of window apertures in the middle of the retainer wall 22. Alternatively, the clips 40 can be separate structures that are attached to a middle of the retainer wall 22 by attachment structures or systems, such as mechanical fasteners, adhesives, welding, etc. Further, it is also contemplated that the clips 40 can be integrally formed in the middle portion of the retainer wall in much the same manner as the integral clips 40 are formed in FIG. 6B.

FIG. 7A is a schematic view of another embodiment of connection structure for connecting the air bag retainer 21 to the air bag chute 30 in cases where these structures are bolted together. In this embodiment, the airbag retainer 21 can include a clip 40 having an upper surface 44 that is angled and in direct contact with a chute wall contact edge 323 of the airbag chute 30. The upper surface 44 is angled and reaches an apex 45 that is spaced from a wall of the chute 30. The air bag retainer 21 can be connected to the airbag chute 30 via a shoulder bolt 71 that has a stem portion running though an opening in the clip 40 of air bag retainer 21. The head of the shoulder bolt 71 can be adjacent to a lower surface of the clip 40 located on the airbag retainer 21. The opening in the clip 40 of the air bag retainer 21 can be wider than a width of the stem portion of the shoulder bolt 71 such that there is a substantial amount of left to right play for the shoulder bolt 71 (i.e., the shoulder bolt 71 can move in a direction transverse to the central axis of the air bag chute 30 and air bag retainer 21). The head of the shoulder bolt 71 can be wider than the opening in the clip 40 of the air bag retainer 21 such that the shoulder bolt 71 (and the air bag chute 30 that is connected to the shoulder bolt 71) is connected to the air bag retainer 21. Thus, as shown in FIG. 7B, if an object O imposes a load onto the instrument panel P, that load can travel from the airbag chute 30 to the airbag retainer 21. During loading, the upper surface 44 of the clip 40 of the air bag retainer 21 will guide the airbag chute 30 to slide downward and to the right (in FIG. 7B). During loading, the upper chute wall contact edge 323 of the chute 30 will be guided along the upper surface 44 in a direction away from the apex 45. This relative sliding movement allows the air bag chute 30 and air bag retainer 21 to absorb some of the force from the loading, resulting in less reactive force applied to the object O during the loading incident. Once the loading incident is complete, the air bag chute 30 can return to its original location shown in FIG. 7A.

During the process depicted in FIG. 7B, the chute 30 may stretch. This action may then result in a force acting opposite of the direction of movement of the air bag chute 30 relative to the air bag retainer 21. This force would return the chute 30 and airbag retainer 21 back to their design or static position post impact. The use of a shoulder bolt 71 to connect the air bag retainer 21 to the air bag chute 30 can ensure that a correct torque of the bolt is applied without compromising the slipping relationship between the air bag chute 30 along the upper surface 44 of clip 40 of air bag retainer 21.

Figure 8A:
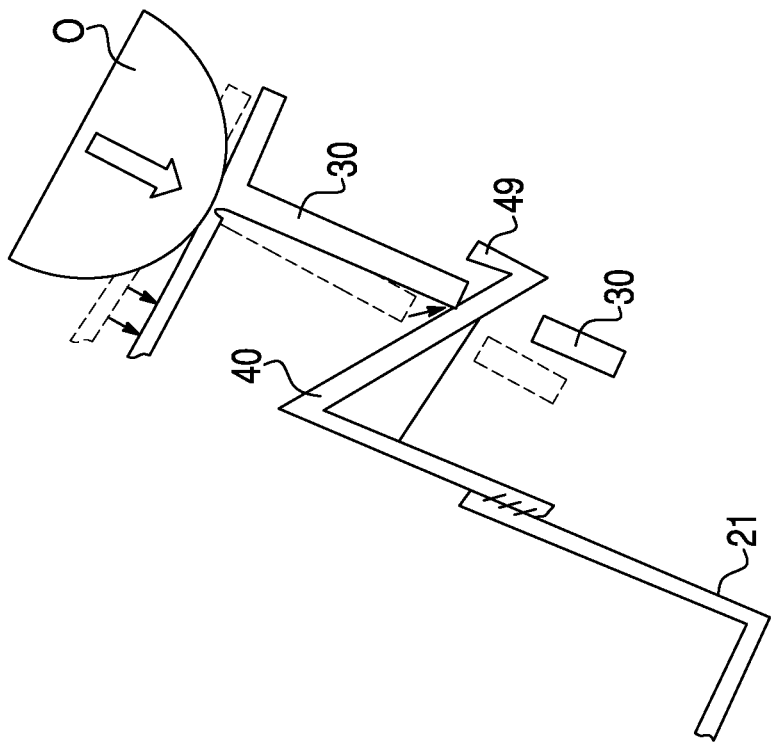
FIG. 8A is a schematic view of another embodiment of connection structure for connecting the air bag retainer to the air bag chute made in accordance with principles of the presently disclosed subject matter.
Figure 8B:
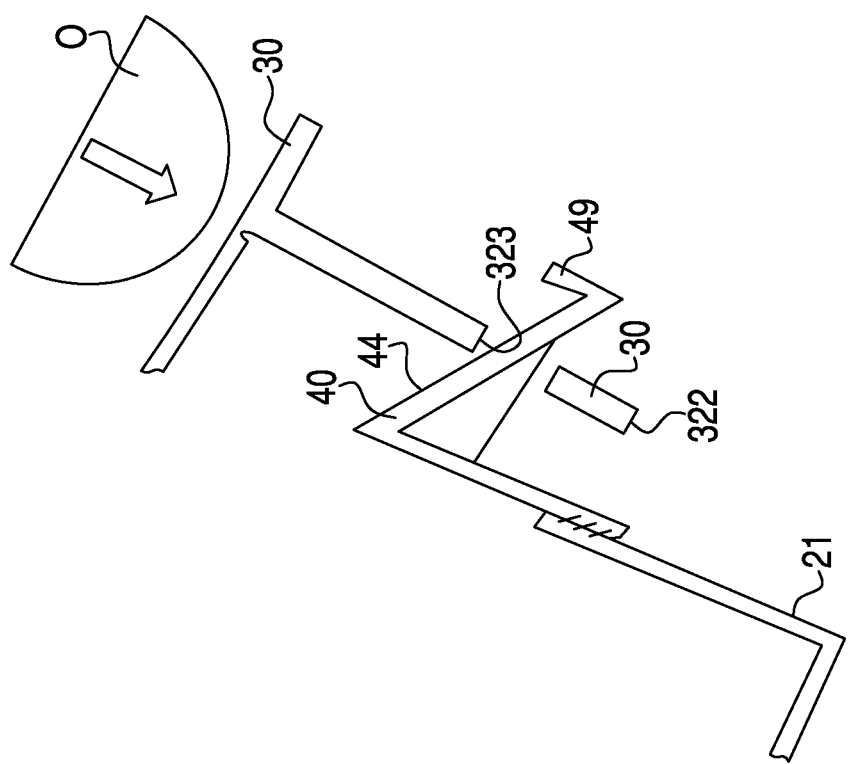
FIG. 8B is a schematic view of the connection structure of FIG. 8A after initial contact with an object.
Figure 8C:
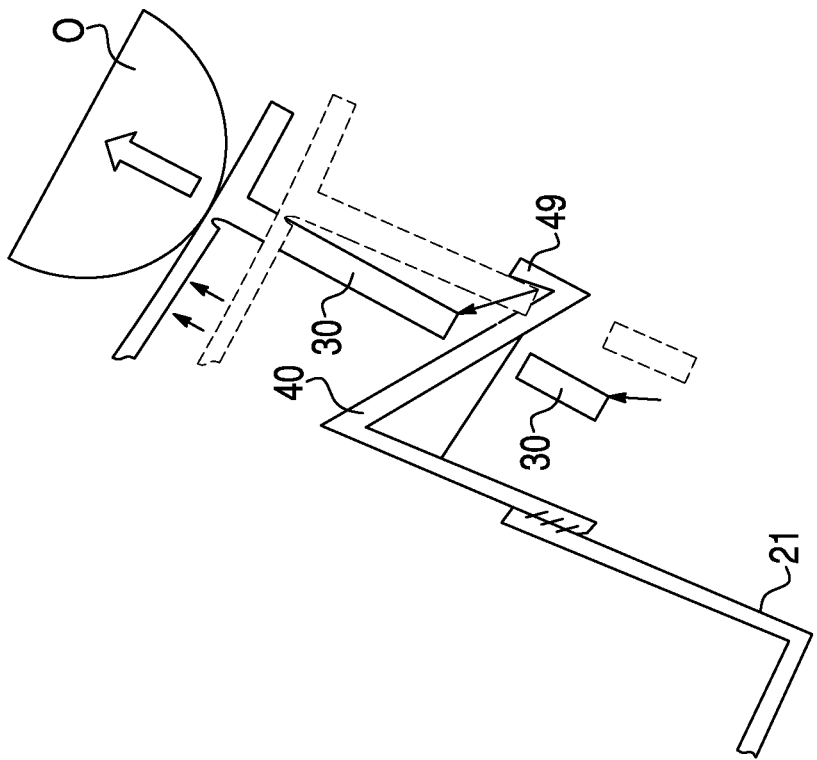
FIG. 8C is a schematic view of the connection structure of FIG. 8A after contact with an object and at a location where the air bag chute contacts a stroke limiter.
Figure 8D:
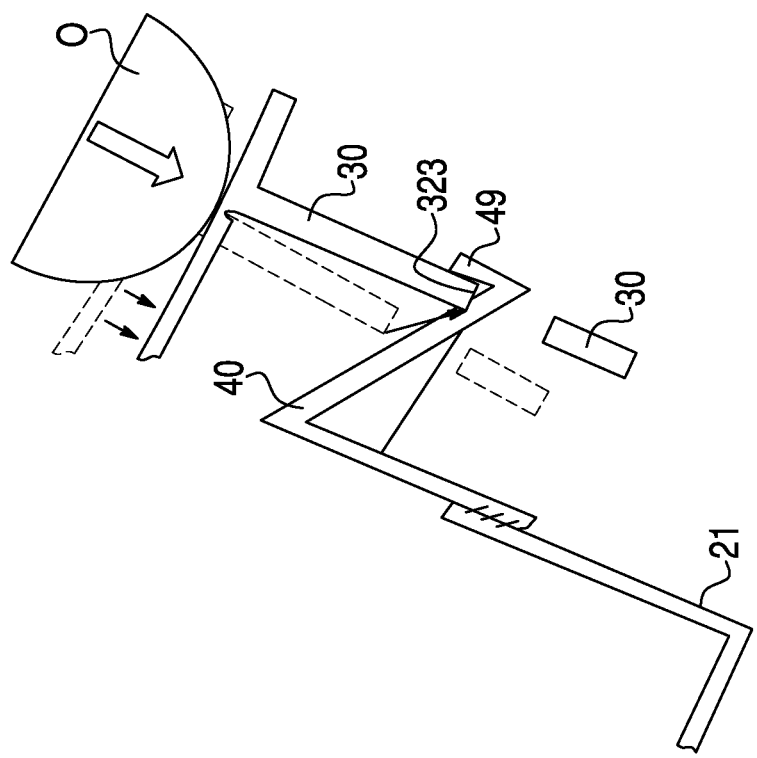
FIG. 8D is a schematic view of the connection structure of FIG. 8A after contact with an object and at a location where the air bag chute returns to a static/original position.

FIGS. 8A, 8B, 8C, and 8D depict an additional embodiment of the connection structure for connecting the air bag retainer 21 to the air bag chute 30 of the presently disclosed subject matter. In this embodiment, the airbag clip 40 can have a stroke limiter 49 located on the upper surface 44 and at an end opposite to the apex 45 of the clip 40. The stroke limiter 49 can be formed as an arm member that extends at an acute (or possibly other) angle with respect to the upper surface 44 of the clip 40. If an object O imposes a load onto the instrument panel P, that load can travel from the airbag chute 30 to the airbag retainer 21. During loading, the stroke limiter 49 can prevent the chute 30 from disengaging from the upper surface 44 of the clip 40 by contacting the upper chute wall contact edge 323 to limit the motion of the chute 30. The stroke limiter 49 can be continuously formed with the clip 40 or alternatively can be a separate piece that is attached at an end of the upper surface 44 of clip 40. In FIG. 8A the connection structure is shown in its static position at a time where no load is applied by an object O to the instrument panel P. In FIG. 8B, an initial load is applied from the object O to the instrument panel P such that the upper chute wall contact edge 323 starts moving towards and is in initial contact with the angled upper surface 44 of the clip 40. The angled upper surface 44 of the clip 40 causes the wall of the air bag chute 30 to start moving downward and towards the right in FIG. 8B (the original static position of the chute 30 shown in dotted line in FIG. 8B). FIG. 8C depicts the air bag chute 30 in a state where the upper chute wall contact edge 323 has come into contact with the stroke limiter 49 after moving due to loading by object O. The stroke limiter 49 prevents the upper chute wall contact edge 323 from slipping off of the far rightward edge (in FIG. 8C) of the clip 40. Thus, stroke limiter 49 ensures that the air bag chute 30 does not completely disengage from the air bag retainer 21 as a result of loading from object O, and further ensures the return of the air bag chute 30 to its original/static position with respect to the airbag retainer 21 (see FIG. 8D). The stroke limiter 49 ensures the clips 40 stay engaged with the air bag chute 30 post impact by object O.

FIGS. 9A, 9B, 9C, and 9D depict an additional embodiment of the connection structure for connecting the air bag retainer 21 to the air bag chute 30 of the presently disclosed subject matter. In this embodiment, a stroke stopper 91 can extend from a lower outer wall of the air bag retainer 21. The stroke stopper 91 can be configured in a substantial Z or S shape as viewed in cross section. One end of the stroke stopper 91 can be connected to the air bag retainer 21 by mechanical attachment structure (bolt, screw, rivet, clamp, etc.), weld, adhesive or other known attachment structure or system. An opposite end of the stroke stopper 91 can be configured such that if an object O imposes a load onto the instrument panel P, and the airbag chute 30 moves downwards and towards the airbag retainer 21, the stroke stopper 91 will contact an outer surface of the air bag chute 30. Thus, the stroke stopper 91 can prevent the chute 30 from disengaging from the clip 40, and can stop further or excessive movement of the air bag chute 30 relative to the air bag retainer 21. Specifically, the lower chute wall 322 of the chute 30 can be contacted by the stroke stopper 91 to limit the outward motion of the chute 30. The stroke stopper 91 can be used in addition to the stroke limiter 49 described above, or can be used without the stroke limiter 49.

Figure 9C:
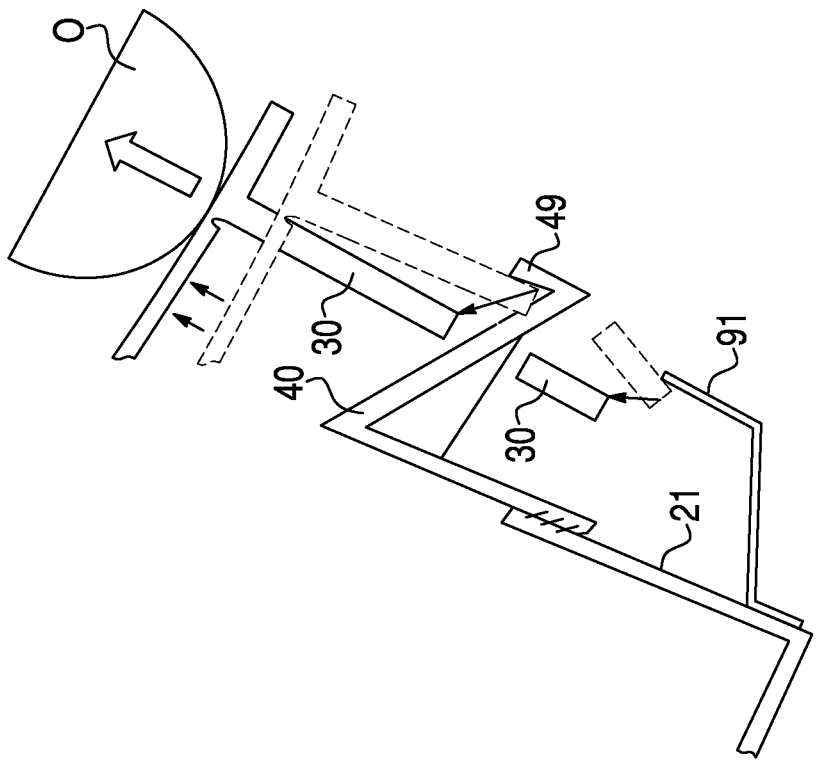
FIG. 9C is a schematic view of the connection structure of FIG. 9A after contact with an object and at a location where a stroke stopper engages the air bag chute.
Figure 9D:
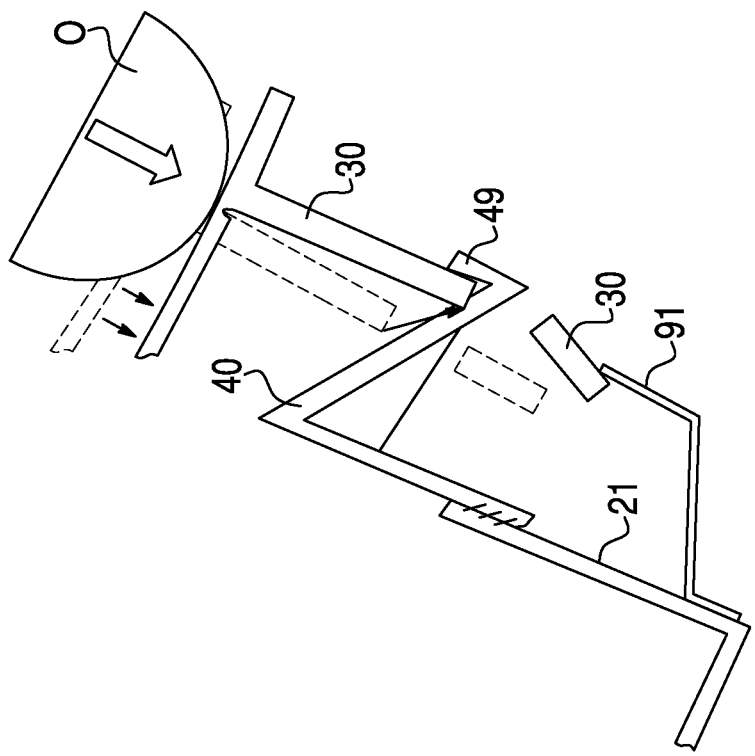
FIG. 9D is a schematic view of the connection structure of FIG. 9A after contact with an object and at a location where the air bag chute returns to a static/original position.

In FIG. 9A the connection structure is shown in its static position at a time where no load is applied by an object O to the instrument panel P. In FIG. 9B, an initial load is applied from the object O to the instrument panel P such that the lower chute wall 322 starts moving towards and is in initial contact with the stroke stopper 91. The original static position of the chute 30 is shown in dotted line in FIG. 9B. FIG. 9C depicts the air bag chute 30 in a state where both the upper chute wall contact edge 323 has come into contact with the stroke limiter 49 and the lower chute wall 322 is in full contact with the stroke stopper 91 (after movement of the air bag chute 30 towards the air bag retainer 21 due to loading by object O). The stroke stopper 91 prevents the air bag chute 30 from completely disengaging from the air bag retainer 21 as a result of loading from object O, and further ensures the return of the air bag chute 30 to its original/static position with respect to the airbag retainer 21 (see FIG. 9D). The stroke stopper 91 ensures the clips 40 stay engaged with the air bag chute 30 post impact by object O.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A vehicle air bag structural device, comprising: an air bag retainer configured to hold a vehicle air bag before deployment, the air bag retainer defining an opening through which the air bag passes during deployment, and at least one clip located adjacent the opening at an outer periphery of the air bag retainer; an air bag chute located adjacent the air bag retainer and configured to guide the air bag along a deployment axis and at least partially out of an upper opening in the air bag chute during deployment from the air bag retainer, the air bag chute having a wall including a clip aperture opening located therein, the clip aperture opening having an upper surface and a lower surface, the upper surface located closer to the upper opening in the air bag chute than the lower surface of the clip aperture opening, the air bag chute configured to move relative to the air bag retainer such that the upper surface of the clip aperture approaches the at least one clip during relative movement of the air bag chute towards the air bag retainer, the at least one clip having an upper surface facing the upper surface of the clip aperture opening, the upper surface of the at least one clip being at an acute angle with respect to the deployment axis and the acute angle upper surface extending from an interior of the air bag chute through the clip aperture and to an exterior of the air bag chute, such that if the air bag chute is moved downward towards the air bag retainer along the deployment axis a pre-set distance, the upper surface of the clip aperture contacts the upper surface of the at least one clip to cause the wall of the air bag chute to continue moving outward and downward along the acute angle upper surface of the at least one clip, the at least one clip having a lower surface opposed to the upper surface and configured such that during deployment of the air bag, the lower surface of the clip contacts the airbag chute to prevent the airbag chute from moving along the deployment axis, and the upper surface of the at least one clip extends away from the air bag chute and through the clip aperture at an angle different from an angle at which the lower surface of the at least one clip extends away from the air bag chute and through the clip aperture, wherein the wall of the air bag chute that is located immediately around the clip aperture opening defines a plane, and the plane intersects the acute angle upper surface of the at least one clip, and the lower surface of the at least one clip extends substantially perpendicular with respect to the plane such that the acute angle upper surface of the at least one clip promotes continued downward movement of the air bag chute with respect to the air bag retainer upon an object imparting force on an upper surface of the air bag chute while the substantially perpendicular lower surface of the at least one clip prevents upward movement of the air bag chute with respect to the air bag retainer during deployment of the air bag.

2. The vehicle air bag structural device as recited in claim 1, wherein the at least one clip has an end located exterior of the air bag chute and outside the wall of the air bag chute, and the at least one clip extends from the end to an apex located interior of the air bag chute, and the apex is located at a position closer to the to the upper opening in the air bag chute along a direction parallel with the deployment axis as compared to a position of the upper surface of the clip aperture opening in the direction parallel with the deployment axis of the chute.

3. The vehicle air bag structural device as recited in claim 2, wherein the end of the at least one clip is located at a position further from the upper opening in the air bag chute along a direction parallel with the deployment axis as compared to a position of the lower surface of the clip aperture opening in the direction parallel with the deployment axis.

4. The structure of claim 1, wherein the upper surface of the at least one clip also forms an acute angle greater than zero with respect to a plane parallel with a portion of the wall of the airbag chute that contains the clip aperture opening.

5. The structure of claim 1, wherein the air bag chute is configured to move towards the air bag retainer if a predetermined force is applied to the air bag chute in a downward direction parallel with the deployment axis, and the at least one clip is configured to cause the side wall of the air bag chute to move outward away from the deployment axis if the air bag chute moves a predetermined distance in the downward direction.

6. The structure of claim 1, wherein the air bag retainer includes an upper peripheral edge of the opening at which the at least one clip is attached, and a closed lower surface configured to hold the air bag.

7. The structure of claim 1, wherein the air bag retainer includes an upper peripheral edge of the opening and the at least one clip is formed in the upper peripheral edge of the opening, the at least one clip including a stroke limiter extending from an upper surface of the at least one clip.

8. The structure of claim 7, further comprising:
a stroke stopper extending from the air bag retainer and configured to contact an outer surface of the air bag chute if the air bag chute moves towards the air bag retainer.

9. The structure of claim 1, wherein the at least one clip includes a bead extending away from the deployment axis and configured to reinforce a torsional strength of the at least one clip.

10. A structure for retaining and deploying a vehicle air bag, comprising: an air bag chute configured as a tubular structure having an upper exit aperture configured for the air bag to exit along a deployment axis during deployment, and a lower aperture, the chute including a side wall extending from the upper exit aperture to the lower aperture, the side wall of the chute including at least one opening extending therethrough with the side wall defining a peripheral surface of the opening; an air bag retainer located adjacent the lower aperture of the air bag chute and configured to store the air bag when in an undeployed state; a hook attached to the air bag retainer and including an upward extending portion, and an outward and downward sloped portion extending from an apex of the upward extending portion, wherein the apex of the upward extending portion is located within the air bag chute such that the outward and downward sloped portion extends from a location within the side wall of the air bag chute, through the opening in the side wall, and to a location outside the side wall of the air bag chute, wherein the outward and downward sloped portion of the hook forms an acute angle greater than zero with respect to a plane parallel with the side wall of the airbag chute and that contains the opening in the side wall, such that if the air bag chute moves towards the air bag retainer the peripheral surface of the opening contacts the downward sloped portion of the hook, and the hook including a lower surface opposite the downward sloped portion extending from a location within the side wall of the air bag chute, through the opening in the side wall, and to a location outside the side wall of the air bag chute, wherein the lower surface of the hook forms a substantially perpendicular angle with respect to the plane parallel with the side wall of the airbag chute such that the downward sloped portion of the hook promotes continued downward movement of the air bag chute with respect to the air bag retainer upon an object imparting force on an upper surface of the air bag chute while the substantially perpendicular lower surface of the hook prevents upward movement of the air bag chute with respect to the air bag retainer during deployment of the air bag.

11. The structure of claim 10, wherein the apex of the upward extending portion of the hook is located at a position closer to the upper exit aperture of the chute along the deployment axis of the chute as compared to a position of any portion of the peripheral surface of the opening in the side wall along the deployment axis of the chute.

12. The structure of claim 10, wherein the air bag chute is configured to move towards the air bag retainer if a predetermined force is applied to the air bag chute in a downward direction parallel with the deployment axis, and the hook is configured to cause the side wall of the air bag chute to move outward away from the deployment axis if the air bag chute moves a predetermined distance in the downward direction.

13. The structure of claim 10, wherein the air bag retainer includes an upper peripheral opening to which the hook is attached, and a closed lower surface at which an air bag is located.

14. The structure of claim 10, wherein the air bag retainer includes an upper peripheral opening and the hook is formed in the upper peripheral opening.

15. The structure of claim 10, wherein the air bag retainer includes an upper peripheral opening and the hook includes a metal rib and a plastic insert located adjacent the metal rib, the plastic insert defining the outward and downward sloped portion of the hook.

16. The structure of claim 10, wherein the hook includes a bead extending away from the deployment axis and configured to reinforce a torsional strength of the hook along an axis extending along the outward and downward sloped portion of the hook.

17. The structure of claim 10, wherein the tubular structure of the air bag chute is substantially circular in shape when viewed in cross section taken perpendicular to the deployment axis.

18. A structure for retaining and deploying a vehicle air bag, comprising:

an air bag retainer configured as a tubular structure with an upper opening at an upper portion of the tubular structure and a closed bottom at a lower portion of the tubular structure;

an air bag chute configured as a tubular structure having an upper exit opening configured for the air bag to exit along a deployment axis during deployment, and a lower opening aligned with the upper opening of the air bag retainer tubular structure, the air bag chute including a side wall extending from the upper exit opening to the lower opening, the side wall of the air bag chute including at least one opening extending therethrough, the tubular structure of the air bag retainer being telescopically located within the tubular structure of the air bag chute such that the air bag chute is movable with respect to the air bag retainer along a telescoping axis direction if a predetermined force is applied to the air bag chute in the telescoping axis direction; and a hook extending from the tubular structure of the air bag retainer through the at least one opening in the side wall of the tubular structure of the air bag chute, the hook including an upper surface that is at an acute angle greater than zero with respect to the telescoping axis direction, and the upper surface of the hook faces upwards towards the upper exit opening of the air bag chute, the hook having a lower surface that extends one of:
  substantially perpendicular with respect to the telescoping axis direction, and
  at an acute angle with respect to the telescoping axis direction and downward away from the upper opening in the air bag chute, and the lower surface of the hook faces the at least one opening in the side wall of the air bag chute and is configured such that during inflation of the air bag the lower surface of the hook contacts the side wall of the air bag chute at the opening to prevent the air bag chute from displacement in the telescoping axis direction, the upper surface of the hook is made of a first material and the lower surface of the hook is made of a second material where the first material is different from the second material.

\* \* \* \* \*